Figure 1:
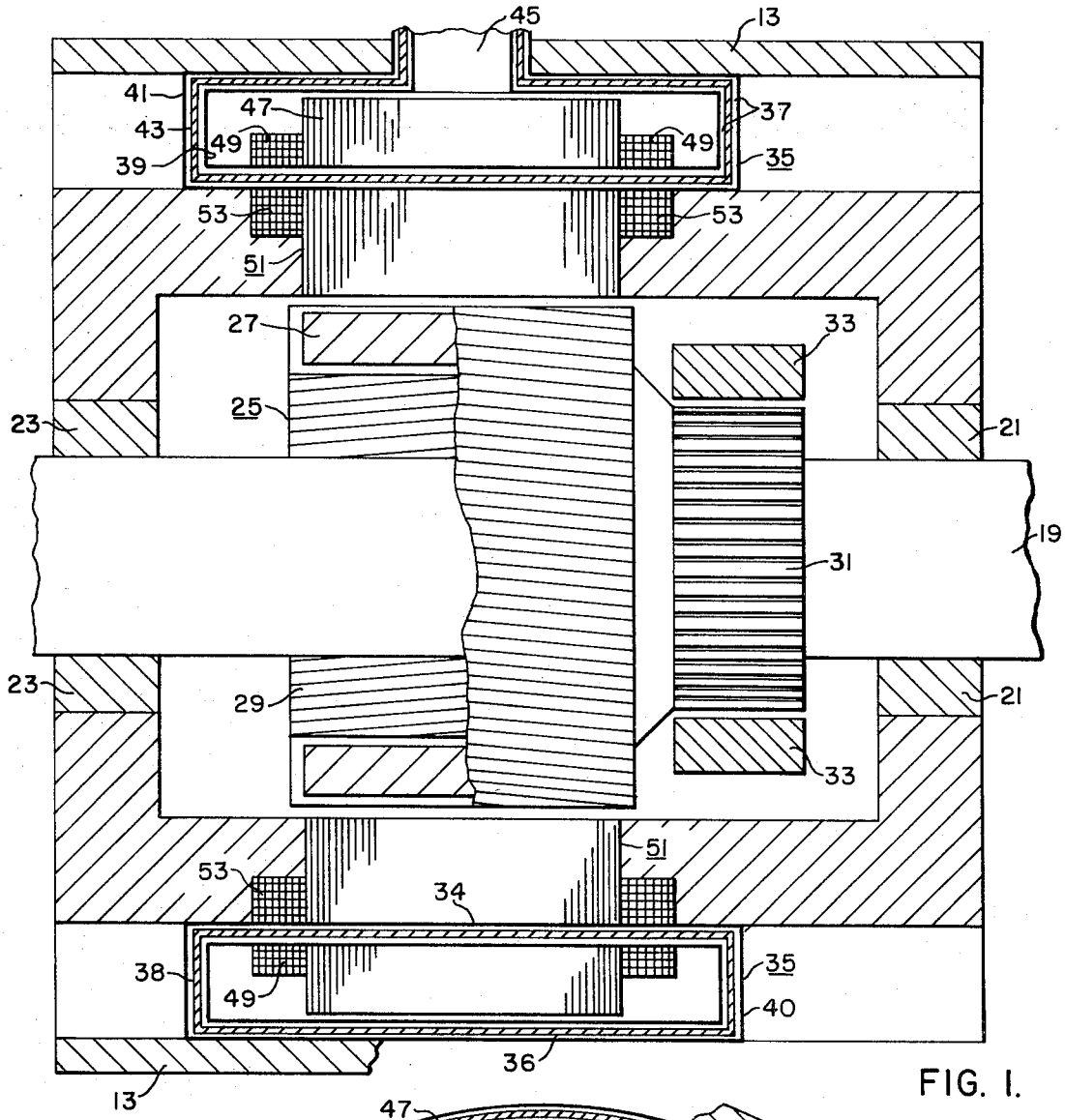
Figure 2:
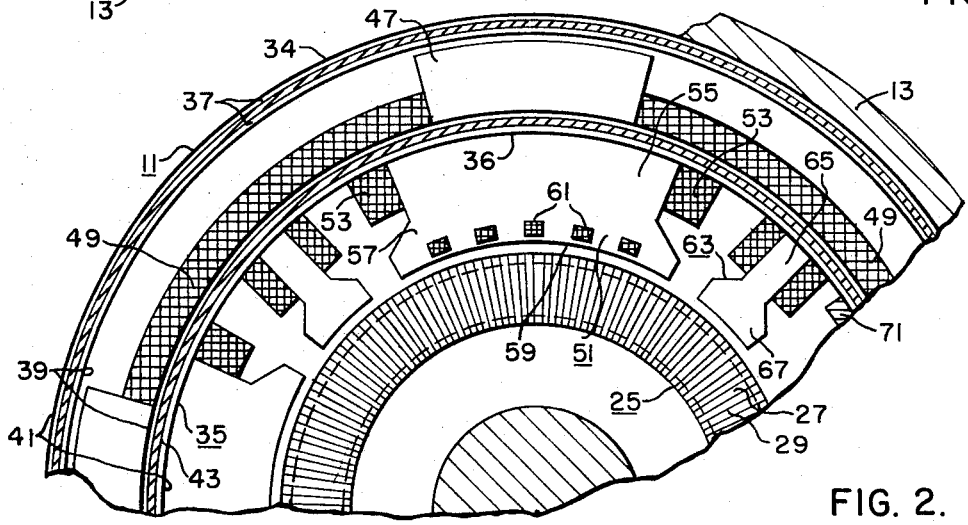
Figure 3:
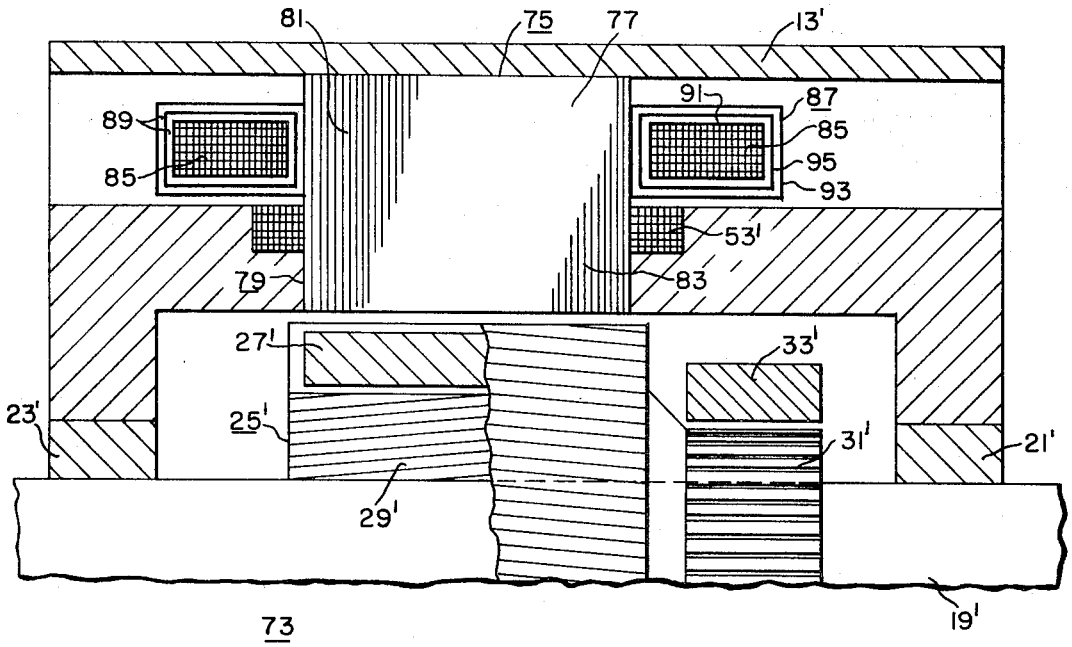
Figure 4:
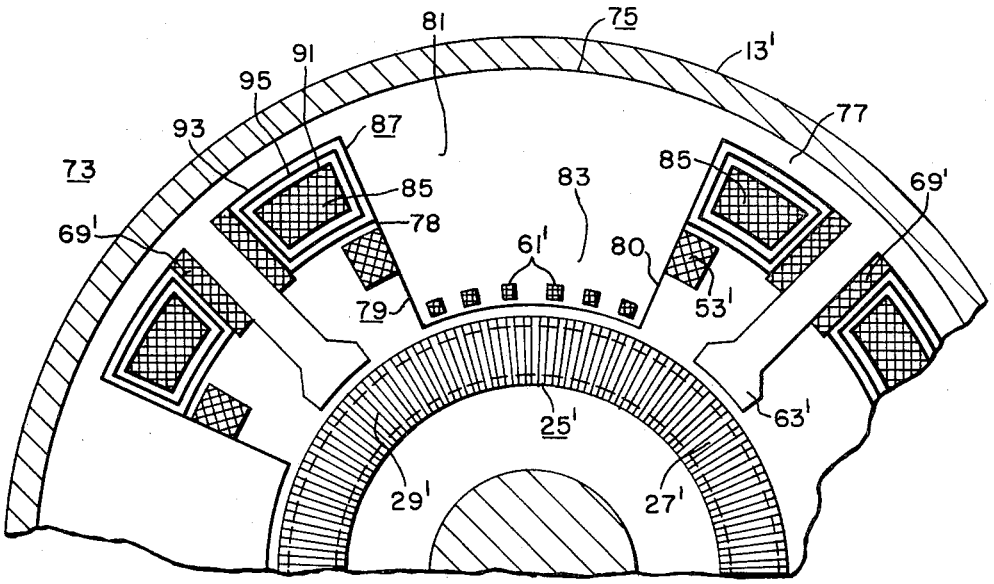
Figure 5:
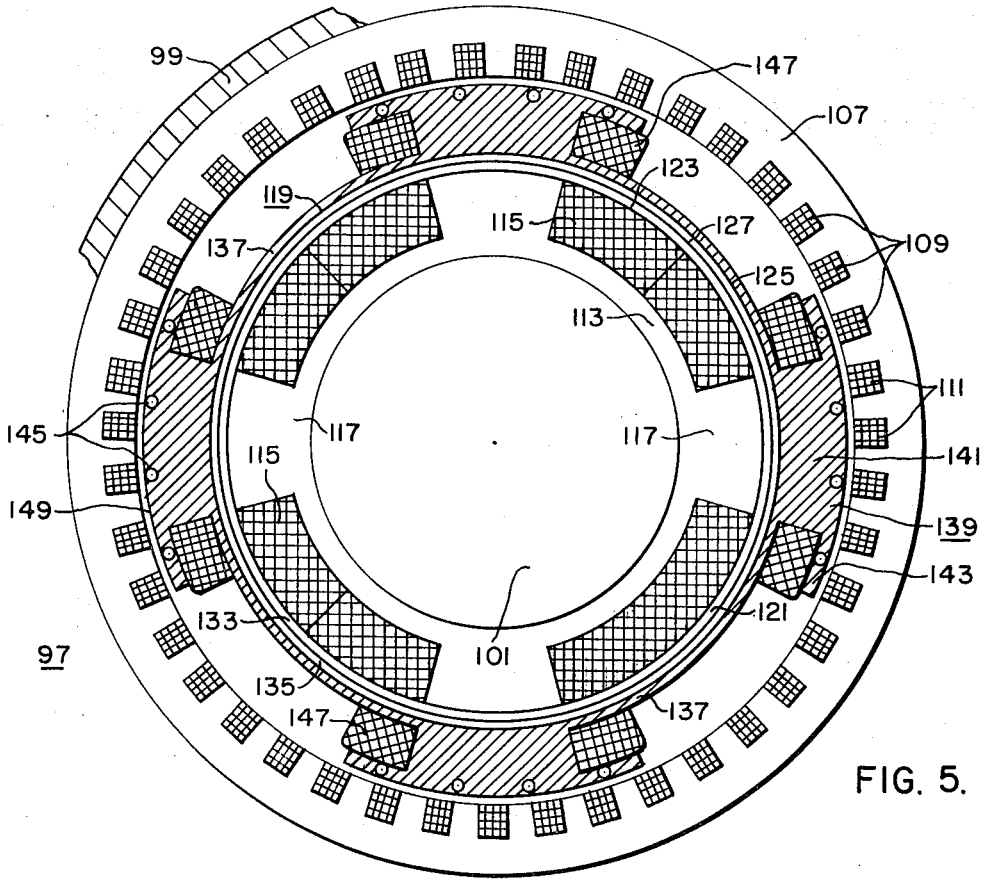
Figure 7:
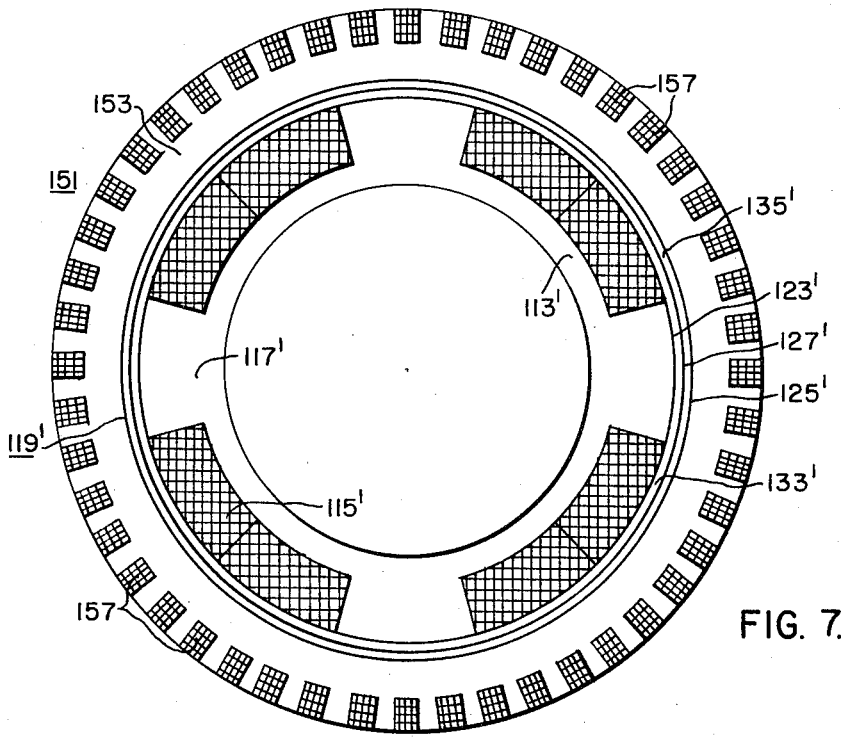
Figure 6:
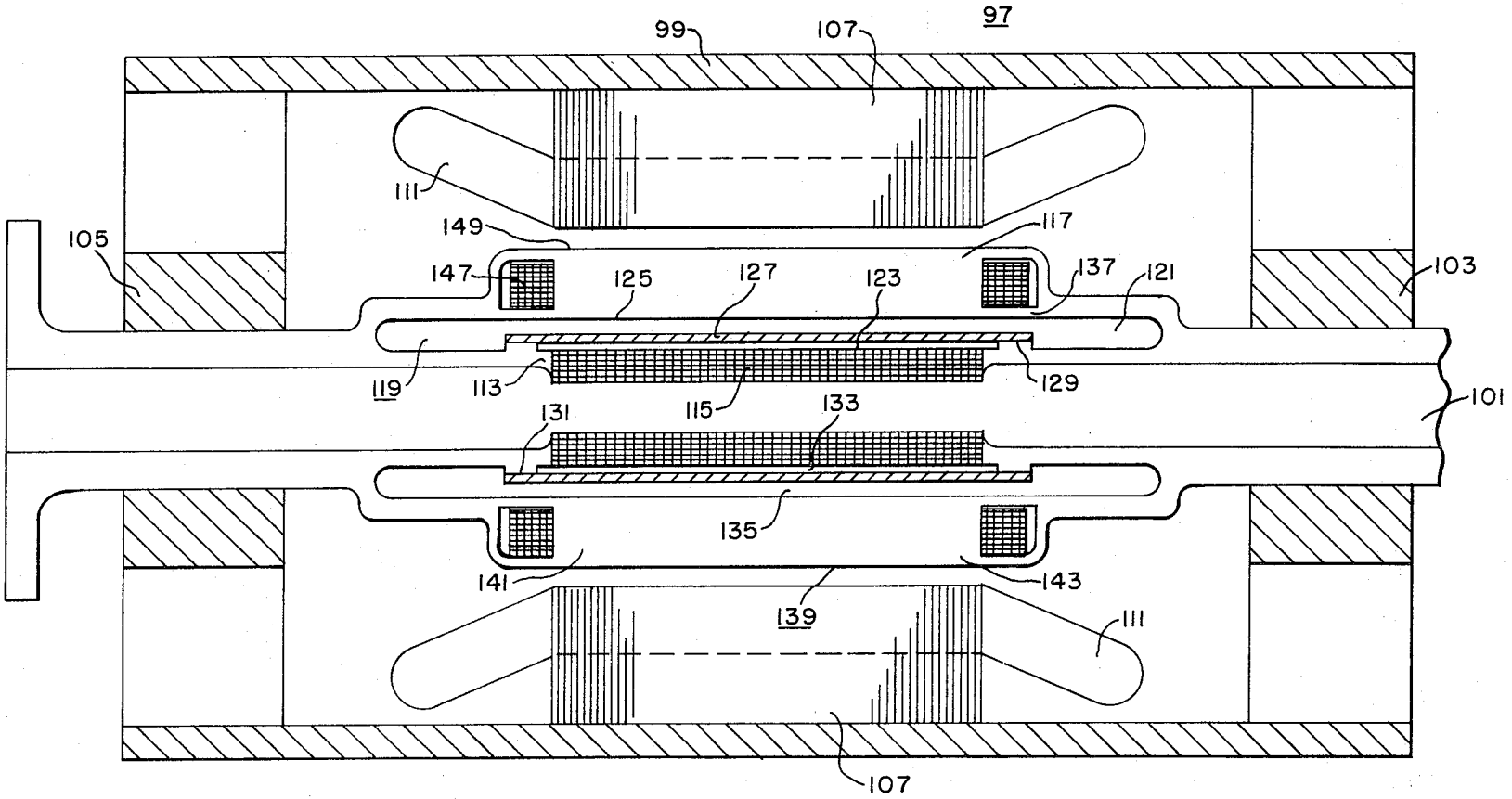

Dec. 4, 1973 C. J. MOLE ET AL T917,006

DYNAMOELECTRIC MACHINERY UTILIZING SUPERCONDUCTIVE WINDINGS

Filed Jan. 29, 1973 4 Sheets-Sheet 1

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 4, 1973

917 O.G. 9

T917,006

DYNAMOELECTRIC MACHINERY UTILIZING SUPERCONDUCTIVE WINDINGS

Cecil J. Mole, Monroeville, and Robert F. Edwards, Murrysville, Pa., assignors to Westinghouse Electric Corporation, Pittsburgh, Pa.

Filed Jan. 29, 1973, Ser. No. 327,540
**Int. Cl. H02k *9/00***
U.S. Cl. 310—52
4 Sheets Drawing. 36 Pages Specification

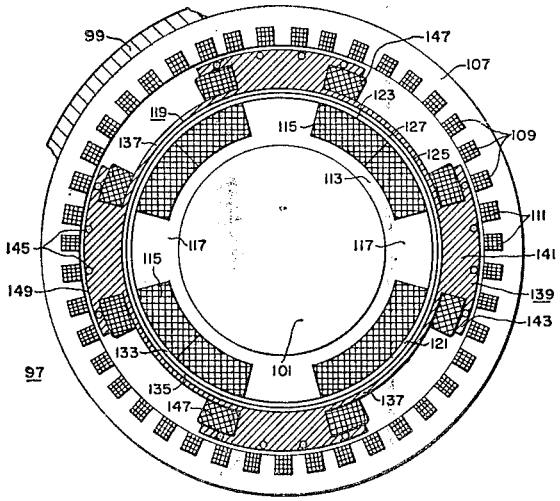

Iron or other ferromagnetic material is utilized in the magnetic circuit of dynamoelectric machines having superconductive field or excitation windings. In DC machines, a stationary salient pole field structure with a superconductive main field winding is utilized. An armature winding is wound about a smooth rotor. In AC machines, a ferromagnetic structure that encloses and rotates with a superconductive excitation winding is utilized. The ferromagnetic structure may include either salient poles interconnected by ferromagnetic shunts or a slotted or toothed rotor.